(12) United States Patent
Koo et al.

(10) Patent No.: US 7,791,909 B2
(45) Date of Patent: Sep. 7, 2010

(54) QUASI-RESONANT CONVERTER AND CONTROLLING METHOD THEREOF

(75) Inventors: Gwan-Bon Koo, Bucheon (KR); Hang-Seok Choi, Bucheon (KR); Jae-Hwoan Chi, Bucheon (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 603 days.

(21) Appl. No.: 11/818,421

(22) Filed: Jun. 13, 2007

(65) Prior Publication Data

US 2007/0285953 A1 Dec. 13, 2007

(30) Foreign Application Priority Data

Jun. 13, 2006 (KR) .................... 10-2006-0052860

(51) Int. Cl.
*H02M 3/335* (2006.01)
(52) U.S. Cl. .................................. 363/21.02
(58) Field of Classification Search ............. 363/20, 363/21.01, 21.02, 21.03, 39, 40, 95
See application file for complete search history.

(56) References Cited

U.S. PATENT DOCUMENTS

| 6,646,894 B2 * | 11/2003 | Hong et al. ............... 363/21.01 |
| 2005/0270808 A1 * | 12/2005 | Choi et al. ............... 363/21.01 |
| 2006/0215424 A1 * | 9/2006 | Aso et al. ............... 363/21.01 |
| 2008/0130324 A1 * | 6/2008 | Choi et al. ............... 363/21.03 |

\* cited by examiner

*Primary Examiner*—Adolf Berhane
(74) *Attorney, Agent, or Firm*—Sidley Austin LLP (57) ABSTRACT

The present invention relates to a quasi-resonant converter. In the quasi-resonant converter according to the present invention, a predetermined first period and a second period following to the first period are set. In the second period, a switch is turned on at a time point where voltages at both ends of the switch fall to the minimum if the second period includes the time point, and the switch is turned on at the end of the second period if the second period does not include the time point. Therefore, the switching frequency of the switch can be restricted within a predetermined range.

15 Claims, 6 Drawing Sheets

FIG. 6

QUASI-RESONANT CONVERTER AND CONTROLLING METHOD THEREOF

CROSS-REFERENCE TO RELATED APPLICATION

This application claims priority to and the benefit of Korean Patent Application No. 10-2006-0052860, filed in the Korean Intellectual Property Office on Jun. 13, 2006, the entire content of which is incorporated herein by reference.

BACKGROUND (a) Field of the Invention

The present invention relates to a converter. More particularly, the present invention relates to a quasi-resonant converter.

(b) Description of the Related Art

A converter transforms one DC voltage to at least one other DC voltage. The DC output voltage outputted from the converter can be greater or smaller than an input voltage. Such a converter is usually used in power electronic devices, particularly, battery power supplies such as a mobile phone or a laptop computer.

Quasi-resonant converters are widely used at present because a quasi-resonant converter increases power conversion efficiency and reduces electromagnetic interference (EMI). Generally, a quasi-resonant converter turns on a switching transistor when the lowest voltage is applied to both ends of the switching transistor due to a resonance. By such a scheme, a switching noise and a switching loss can be reduced in the quasi-resonant converter.

When an output load decreases in the quasi-resonant converter, a switching frequency increases, because the peak of the current flowing through a switching element decreases. When the switching frequency increases, the switching loss increases too.

The above information disclosed in this Background section is only for enhancement of understanding of the background of the invention and therefore it may contain information that does not form the prior art that is already known in this country to a person of ordinary skill in the art.

SUMMARY

Briefly and generally, embodiments of the present invention include a quasi-resonant converter and a controlling method thereof, where a switching frequency of a switching transistor is restricted to a predetermined range regardless of load.

In an embodiment, a quasi-resonant converter can include a primary coil of a transformer, a switch, a switch voltage detector, and a switching controller. The primary coil can include a first end electrically coupled to a rectified DC voltage signal. The switch is electrically coupled to a second end of the primary coil of the transformer. The switch voltage detector senses a first signal denoting voltages at both ends of the switch. The switching controller sets a predetermined first period and a second period following the first period. Then, the switching controller turns on the switch at time point where the first signal falls to a minimum voltage if the second period includes the time point, and turns on the switch at a time point of ending of the second period if the second period does not include the time point.

The minimum voltage may be a voltage at a time when the first signal falls to a minimum after turning off the switch.

The first period may start at a time when the switch is turned on.

The switching controller may decide a time of turning off the switch by comparing a signal corresponding to a current flowing through the switch and a signal corresponding to an output voltage of the quasi-resonant converter.

The delay circuit may include a first resistor and a second resistor electrically coupled in series between the secondary coil and a ground, and a capacitor electrically coupled between a contact node of the first resistor and second resistor and the ground.

In an embodiment, a method is described for controlling a quasi-resonant converter, which can include a primary coil of a transformer having a first end electrically coupled to a rectified DC voltage signal and a switch electrically coupled to a second end of the primary coil of the transformer. In the method, a first signal denoting voltages at both ends of the switch can be sensed. A predetermined first period and a second period following the first period can be set. Then, the switch can be turned on at time point where the first signal falls to a minimum voltage if the second period includes the time point, and the switch is turned on at a time point of ending of the second period if the second period does not include the time point. The method may further include deciding a time of turning off the switch by comparing a signal corresponding to a current flowing through the switch and a signal corresponding to an output voltage of the quasi-resonant converter. The minimum voltage may be a voltage of a time when the first signal falls to a minimum after the switch is turned off. The first period may be a period starting at a time of turning on the switch.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

Figure 1:
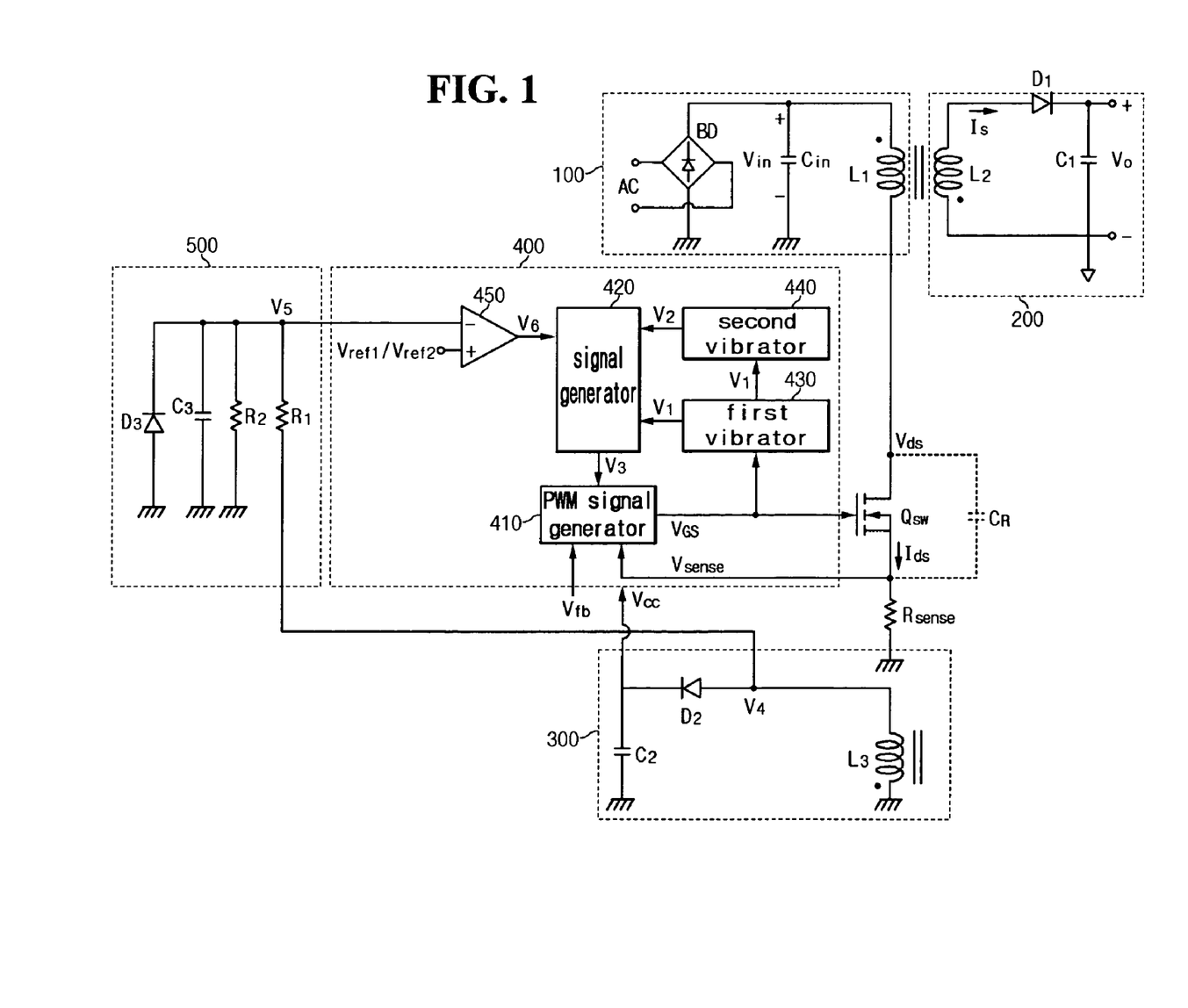
FIG. 1 is a diagram illustrating a quasi-resonant converter.

FIG. 1 is a diagram illustrating a quasi-resonant converter. The quasi-resonant converter can include a power supply 100, an output unit 200, a bias voltage supply 300, a switching controller 400, and a switching voltage detector 500.

The power supply 100 can include a bridge diode BD for rectifying an input AC voltage, a capacitor Cin for smoothing the rectified voltage, and a primary coil L1 of a transformer connected to one end of the capacitor Cin. The power supply 100 transforms an AC voltage to a DC voltage Vin using the bridge diode BD and the capacitor Cin, and supplies power to the secondary side of the transformer, referred to as the output unit 200, according to a duty of the switching transistor Qsw.

The output unit 200 can include a secondary coil L2 of the transformer, a diode D1 having an anode connected to one end of the secondary coil L2 of the transformer, and a capacitor C1 connected between a cathode of the diode D1 and the ground. A voltage between ends of the capacitor C1 is referred to as an output voltage Vo.

The bias voltage supply 300 can include a secondary coil L3 of a transformer, a diode D2 having an anode connected to the secondary coil L3 of the transformer, and a capacitor C2, connected between a cathode of the diode D2 and the ground.

The switching controller 400 can be embodied as a general IC. The bias voltage supply 300 can supply a bias voltage to drive the IC of the switching controller 400. When a switching transistor Qsw starts switching, the secondary coil L3 of the transformer and the diode D2 become driven, thereby generating a bias voltage Vcc between ends of the capacitor C2.

The switching controller 400 can include a pulse with modulator (PWM) signal generator 410, a signal generator 420, a first vibrator 430, a second vibrator 440, and a comparator 450. The switching controller 400 can receive a feedback signal Vfb, a sensing signal Vsense that senses a current Ids flowing through the switching transistor Qsw, and an output signal V5 of the switching voltage detector 500. The switching controller 400 can output a signal VGS for controlling a turn-off/turn-on operation of the switching transistor Qsw. The feedback signal Vfb can be a signal having information corresponding to the output voltage Vo, and can be used to decide a time of turning off the switching transistor Qsw. Since a method of generating the feedback signal Vfb is not directly related to the present invention and is well known to a person of ordinary skill in the art, the detailed description thereof will be omitted.

The PWM signal generator 410 can receive a signal V3 transmitted from the signal generator 420, a sensing signal Vsense, and a feedback signal Vfb, and can output a signal VGS for controlling the turn-on/turn-off operation of the switching transistor Qsw.

The first vibrator 430 can generate a signal V1 using a signal VGS outputted from the PWM signal generator 410 and can transmit the generated signal V1 to the signal generator 420 and the second vibrator 440. The second vibrator 440 can generate a signal V2 using the signal V1 transmitted from the first vibrator 430, and can transmit the signal V2 to the signal generator 420.

The signal generator 420 can generate a signal V3 using the V1 signal, the V2 signal, and an output signal V6 of the comparator 450, and can transmit the V3 signal to the PWM signal generator 410 in order to turn on the switching transistor Qsw. If the signal V2 is in a high state, for example, during a Tw period in FIG. 2, and if the output signal V6 of the comparator 450 changes from high to low state, the signal generator 420 can output a short pulse. Also, if the signal V2 is in high state, and if the output signal V6 of the comparator 450 does not change from high to low state, the signal generator 420 can output a short pulse at a time when the V2 signal changes from high to low state. The PWM signal generator 410 can output a VGS signal changing from low to high state in order to turn on the switching transistor Qsw when receiving a short pulse from the signal generator 420.

The comparator 450 can receive the output signal V5 of the switching voltage detector 500 through an inverting terminal − and a reference voltage Vref1/Vref2 through a non-inverting terminal +, and can output a signal V6 by comparing the output signal V5 and the reference voltage Vref1/Vref2. The reference voltage Vref1 can be a voltage higher than the reference voltage Vref2. The comparator 450 can output a high signal if the signal V5, inputted to the inverting terminal + is higher than the reference voltage Vref1, and can output a low signal if the signal V5 is lower than the reference voltage Vref2. Also, the comparator 450 can sustain the previous signal state if the signal V5 is in between the reference voltages Vref1 and Vref2. Such a comparator 450 can be embodied using a Schmitt Trigger.

Figure 3:
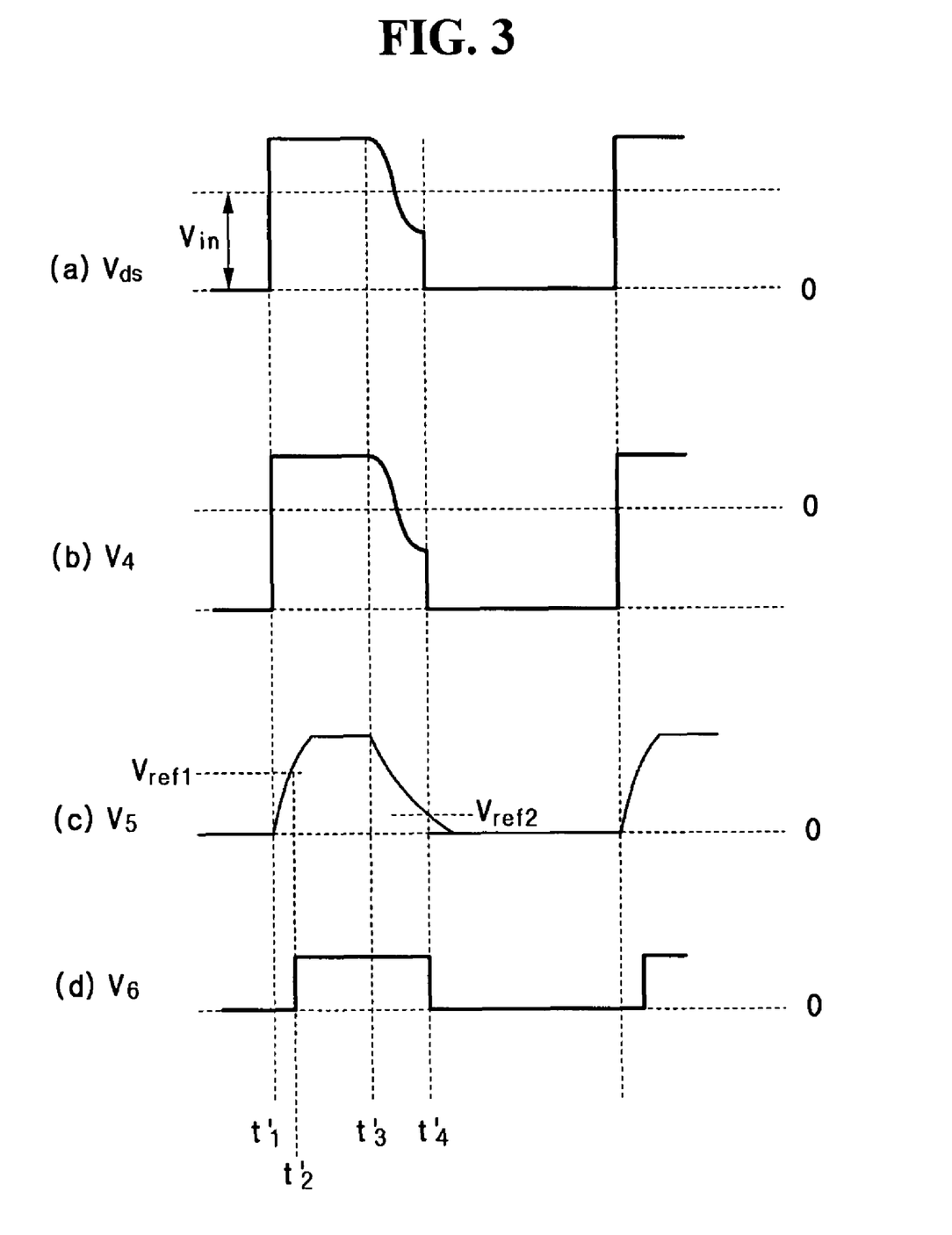
FIG. 3 is a schematic diagram illustrating a drain-source voltage Vds, a signal V4, a signal V5, and a signal V6 of FIG. 1.

The switching voltage detector 500 can generate a signal V5 corresponding to a drain-source voltage of the switching transistor Qsw using the voltage V4 of the secondary coil L3 of the transformer, and can transmit the generated signal V5 to the switching controller 400. The switching voltage detector 500 can include resistors R1 and R2, a capacitor C3, and a diode D3. The resistors R1 and R2 can be connected between the secondary coil L3 of the transformer and the ground in series, and the capacitor C3 and the diode D3 can be connected between a node, connecting the resistors R1 and R2, and the ground in parallel. The secondary coil L3 of the transformer can reflect the voltage across the primary coil L1. The voltage across the primary coil L1 can be a voltage obtained by subtracting the Vin voltage from a drain-source voltage Vds of the switching transistor Qsw. Accordingly, the voltage V4 across the secondary coil L3 of the transformer can reflect the drain-source voltage Vds of the switching transistor Qsw. The resistors R1 and R2 and the capacitor C3 can function as an RC filter, for example, a delay circuit. The voltage V5 can correspond to a drain source voltage Vds of the switching transistor Qsw as shown in FIG. 3. The diode D3 can clamp the voltage V5 not to fall below a predetermined voltage.

The drain of the switching transistor Qsw can be connected to an end of the primary coil L1 of the transformer, and a sensing resistor Rsense can be connected between the source of the switching transistor Qsw and the ground. A resonance capacitor CR can be additionally connected between the drain and the source of the switching transistor Qsw. In embodiments without an explicit resonance capacitor CR, a parasitic capacitance between the drain and the source of the switching transistor Qsw can be used to induce resonance. Hereinafter, the quasi-resonant converter will be described under the assumption of using a resonance capacitor CR for convenience. Although the switching transistor Qsw is shown as a MOSFET in FIG. 1, it can be substituted with other switching transistors that can switch. The switching transistor Qsw can become turned on or turned off by being controlled by the output signal VGS of the PWM signal generator 410.

Hereinafter, the operation of the quasi-resonant converter will be described with reference to FIG. 2 to FIG. 5.

Figure 2:
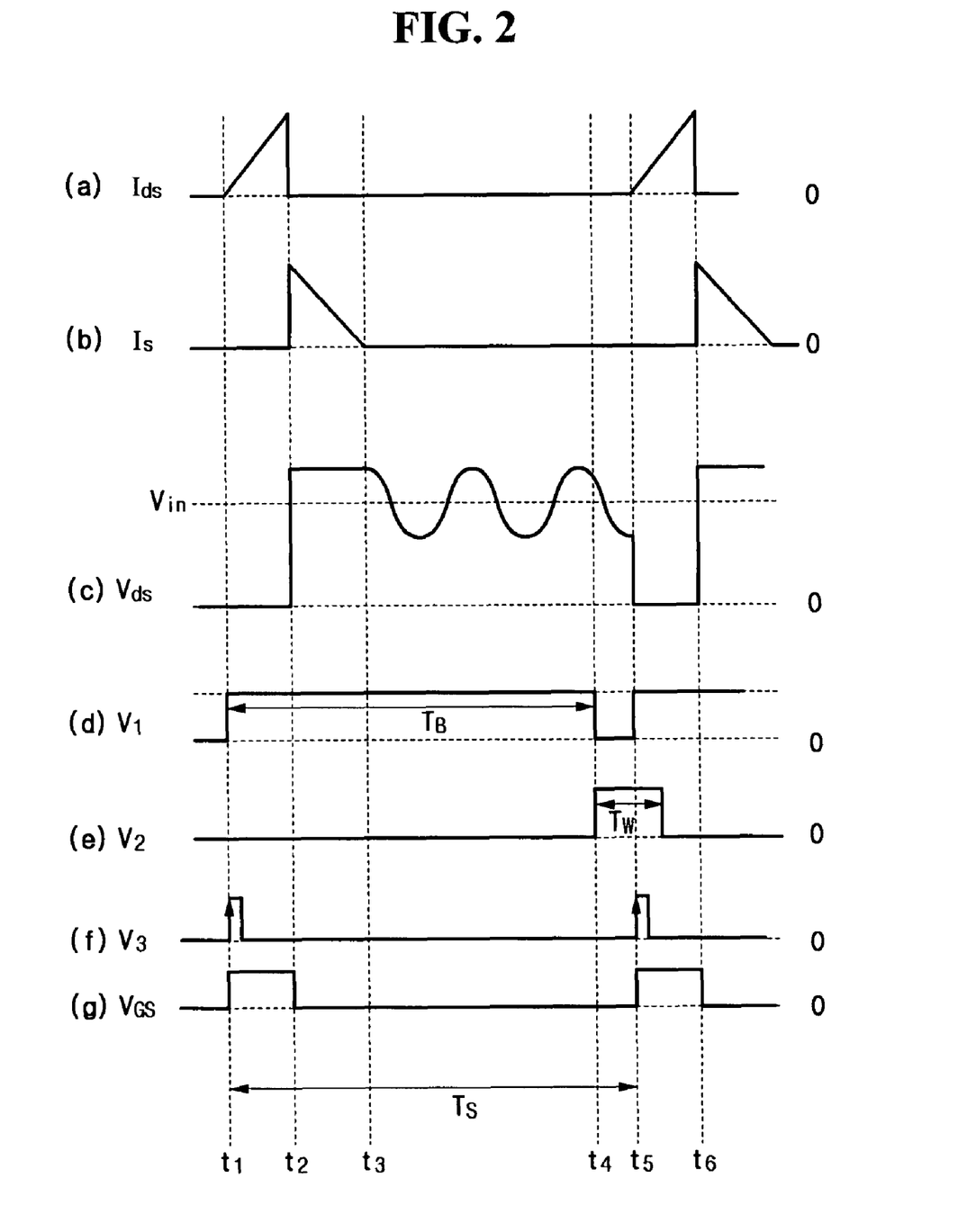
FIG. 2 is a diagram illustrating signals outputted from each element in FIG. 1.

FIG. 2 is a diagram illustrating signals outputted by circuit elements in FIG. 1. At a time t1, the switching transistor Qsw is turned on if the output signal $V_{GS}$ of the PWM signal generator 410 changes to a high state. A method of changing the signal $V_{GS}$ to high state will be described in later. As shown in (a) of FIG. 2, the current Ids flowing through the switching transistor Qsw increases with a predetermined slope Vin/L1. The sensing signal Vsense changes in accordance with the current Ids, sensed by the sensing resistor Rsense. The sensing signal Vsense is transmitted to the PWM signal generator 410. The PWM signal generator 410 changes the signal $V_{GS}$ from high to low state at a time t2 by comparing the feedback signal Vfb and the sensing signal Vsense. Accordingly, the switching transistor Qsw is turned off at the time t2.

When the switching transistor Qsw is turned off at the time t2, as shown in (b) of FIG. 2, the current Is flowing through the diode D1 is reduced to substantially zero with a slope of −Vo/L2. Also, the drain-source voltage Vds of the switching transistor Qsw increases up to Vin+Vo*Np/Ns, where Np/Ns denotes a turn ratio of the primary side and the secondary side of the transformer.

At a time t3 when the current Is becomes substantially zero, the diode D1 becomes turned off and the secondary coil L2 changes to high impedance state. As a result, resonance is induced between the primary coil L1 of the transformer and the resonance capacitor $C_R$. A resonance period is determined by the inductance of the primary coil L1 and the value of the capacitance of the resonance capacitor $C_R$. When the resonance is induced between the primary coil L1 of the transformer and the resonance capacitor $C_R$, the Vds signal can change along a cosine curve based on the voltage Vin.

Meanwhile, the first vibrator 430 outputs a signal V1 according to the signal $V_{GS}$. As shown in (d) of FIG. 2, the first vibrator 430 changes the signal V1 to high state when the signal $V_{GS}$ changes from low to high state, for example, at the time t1 in FIG. 2, and changes the signal V1 to low state after sustaining the signal V1 at high state for a predetermined blocking period $T_B$. The $T_B$ period can be set in a wide range of values. The signal generator 420 does not generate a short pulse during the blocking period $T_B$ in order to prevent the next turn-on of the switching transistor Qsw.

The second vibrator 440 outputs a signal V2 according to the state of the signal V1. As shown in (e) of FIG. 2, the second vibrator 440 changes the signal V2 to low state after sustaining the signal V2 at high state for a sensing period Tw. The sensing period Tw starts at a time t4 when the signal V1 changes from high to low state. The minimum value of a drain-source voltage Vds of the switching transistor Qsw is sensed only during the sensing period Tw. The signal generator 420 generates a short pulse when the minimum of the drain-source voltage Vds of the switching transistor Qsw is sensed during the sensing period Tw. Referring to (c) and (e) of FIG. 2, the drain-source voltage Vds assumes its minimum within the sensing period Tw at a time t5. The signal generator 420 generates a short pulse at the time t5. If the drain-source voltage Vds does not assume a minimum, during the sensing period Tw as e.g. shown in FIG. 5, the signal generator 420 generates the short pulse after the sensing period Tw. A method of detecting a time when the drain-source voltage Vds assumes a minimum value after resonance starts will be later described in detail with reference to FIG. 3.

As shown in (f) of FIG. 2, the signal generator 410 generates a short pulse at the time t5, and the PWM signal generator 410 changes the signal $V_{GS}$ to high state at the short pulse. Accordingly, the switching transistor Qsw is turned on at the time t5 where the drain-source voltage Vds of the switching transistor Qsw is low, thereby reducing the switching loss.

Hereinafter a method of sensing the drain-source voltage Vds of the switching transistor Qsw and a method of sensing a time when the drain-source voltage Vds assumes a minimum value after resonance will be described with reference to FIG. 3.

FIG. 3 is a schematic diagram illustrating the drain-source voltage Vds, a signal V4, a signal V5, and a signal V6 of FIG. 1.

FIG. 3(a) illustrates a particular time dependence of the drain-source voltage Vds. Such a drain-source voltage Vds makes the primary coil L1 of the transformer generate a signal falling by as much as the voltage Vin from the drain-source voltage Vds. FIG. 3(b) illustrates that the second coil L3 of the transformer generates a signal V4 according to a turn ratio of the transformer. As shown in (a) and (b) of FIG. 3, the minimum voltage of the drain-source voltage Vds can be sensed using the signal V4 because the signal V4 directly reflects the drain-source voltage Vds.

FIG. 3(c) illustrates the signal V5, generated by the switching voltage detector 500. The signal V5 is generated by the resistors R1 and R2 of the switching voltage detector 500 and a capacitor C3. The signal V5 rises and falls, following the signal V4 by a RC time constant. As a result, the time when the drain-source voltage Vds assumes its minimum is slightly different from the time when the signal V5 assumes its minimum. Hence, the resistors R1 and R2 of the switching voltage detector 500 and the capacitor C3 function as a delay circuit that delays the signal V4 to generate the signal V5. In a view of the delay circuit function of the switching voltage detector 500, the comparator 450 has two reference voltages Vref1 and Vref2 as described above. The reference voltage Vref1 is set as a voltage lower than the maximum voltage of the signal V5, and the reference voltage Vref2 is set as the voltage V5 at the time when the drain-source voltage Vds assumes its minimum after resonance.

As described above, the comparator 450 outputs a high signal if the signal V5 is higher than the reference voltage Vref1, and outputs a low signal if the signal V5 is lower than the reference voltage Vref2. The comparator 450 sustains a previous state if the signal V5 is in between the reference voltages Vref1 and Vref2. As shown in (d) of FIG. 3, the output signal V6 of the comparator 450 changes to high state at a time t2' and changes from high to low state at a time t4'. Visibly, the signal V6 changes from high to low state when the signal Vds assumes its minimum.

The signal generator 420 generates a short pulse at time t5 of FIG. 2, when the signal V2 is in high state and when the signal V6 changes from high to low state. The signal generator 420 does not generate a short pulse in the blocking period $T_B$. The signal generator 420 generates a short pulse when the minimum voltage is sensed within the sensing period Tw.

Figure 4:
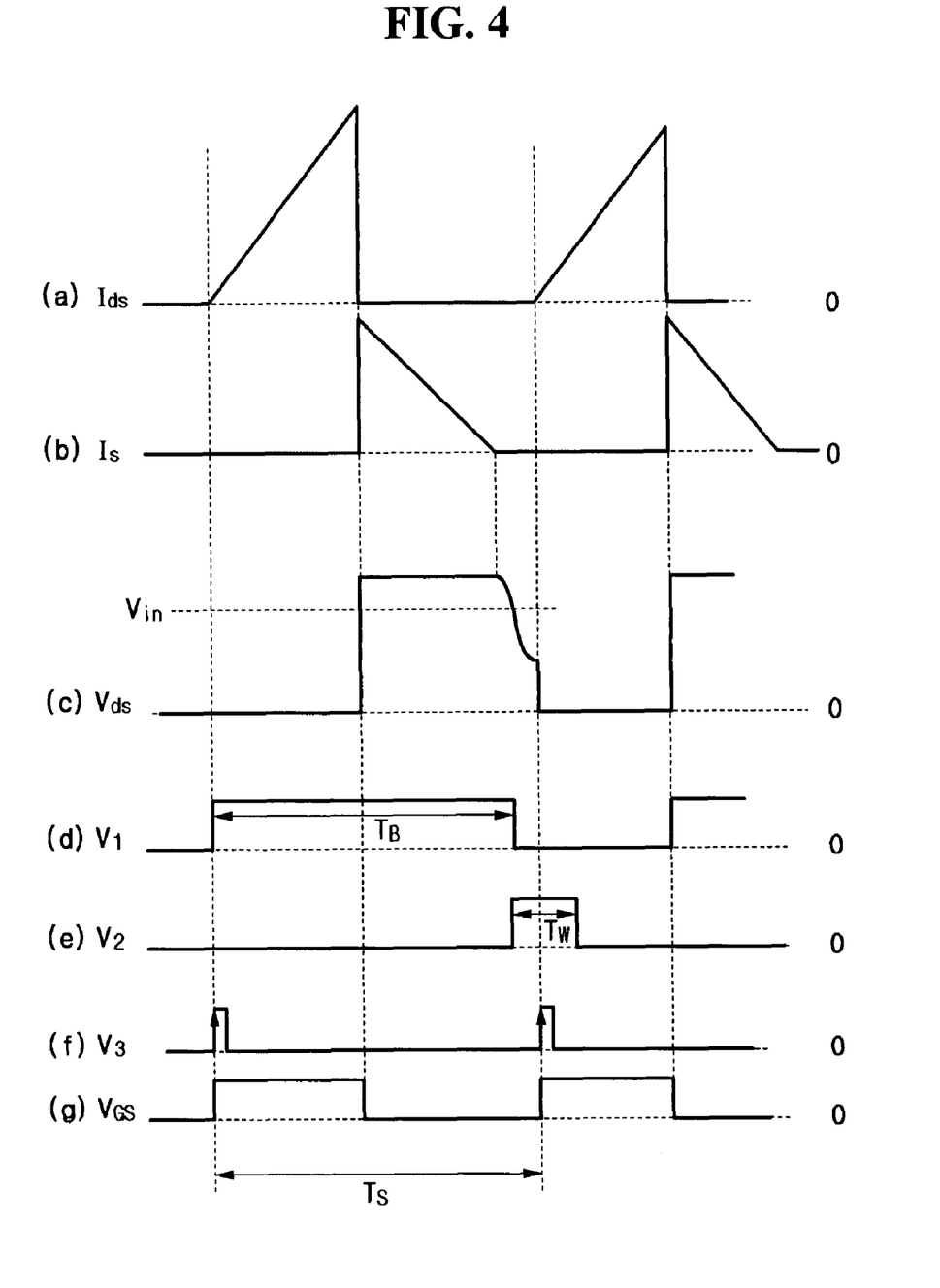
FIG. 4 is a diagram illustrating signals when an output load is higher than the output load of FIG. 2.
Figure 5:
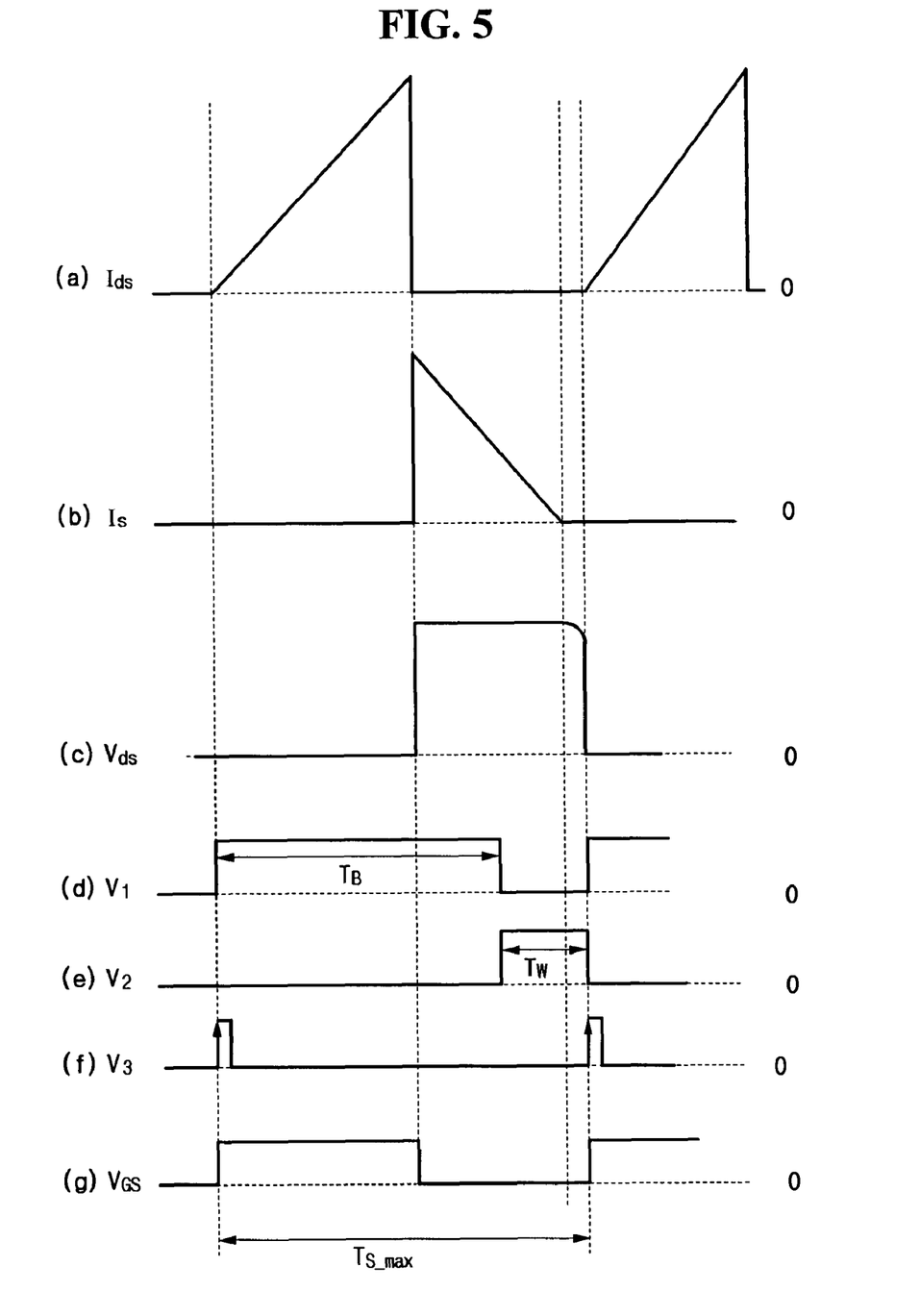
FIG. 5 is a diagram illustrating signals when an output load is higher than the output load of FIG. 4.

FIG. 4 is a diagram illustrating signals when an output load is higher than the output load of FIG. 2. FIG. 5 is a diagram illustrating signals when an output load is even higher than the output load of FIG. 4. Since FIG. 4 and FIG. 5 are analogous to FIG. 2 except the value of the output load, detailed description of duplicated elements will be omitted.

As shown in FIG. 4, when the output load is higher than in FIG. 2, the current Ids rises up to a high peak level. The resonance between the primary coil L1 of the transformer and the resonance capacitor CR starts later. Since the blocking period TB and the sensing period Tw are a predetermined value, the switching transistor Qsw becomes turned on when the drain-source voltage Vds assumes its minimum at the first time by inducing the resonance between the primary coil L1 of the transformer and the resonance capacitor CR.

As shown in FIG. 5, the current Ids rises to an even higher peak level compared to FIG. 4. Therefore, the resonance between the primary coil L1 of the transformer and the resonance capacitor CR starts even later. Since the blocking period TB and the sensing period Tw are a predetermined value, the minimum of the drain-source voltage Vds is not sensed during the sensing period Tw. In this case, the PWM signal generator 410 forcedly generates a short pulse although the minimum voltage of the signal Vds is not sensed. Accordingly, Ts_max, the maximum of a switching period Ts, becomes $T_B$+Tw.

The switching period Ts of the switching transistor Qsw will not exceed $T_B+T_W$, although the output load is extremely high. Accordingly, the switching frequency f of the switching transistor Qsw is restricted the following range:

$$1/(T_B+T_W) \leq f \leq 1/T_B \qquad (1)$$

Figure 6:
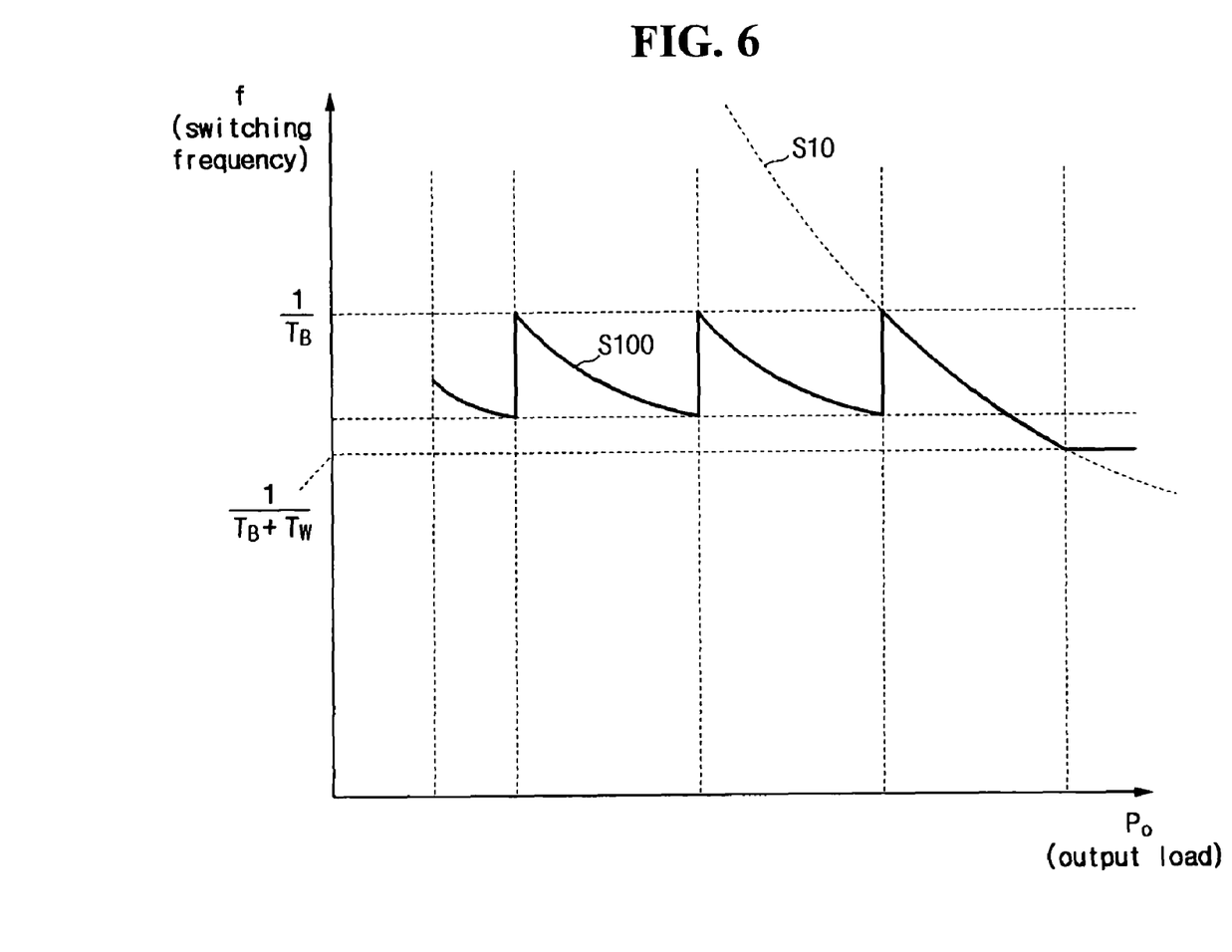
FIG. 6 is a graph showing relation between an output load Po and a switching frequency f in a quasi-resonant converter according to an exemplary embodiment of the present invention, and relation between an output load Po and a switching frequency f in a typical quasi-resonant converter.

FIG. 6 is a graph showing a relation between an output load Po and the switching frequency f in one of the above embodiments of the quasi-resonant converter. The same relation is also shown for a traditional quasi-resonant converter. In FIG. 6, a curve S100 denotes the switching frequency f varying according to the output load in one of the above embodiments of the quasi-resonant converter. A curve S10 denotes the switching frequency f varying according to the output load in a traditional quasi-resonant converter.

Referring to S100, in the above-described embodiments of the quasi-resonant converter, the switching frequency f is restricted within the range represented by Eq. (1), when the output load Po changes. When the output load Po is low, the switching frequency does not exceed the maximum $1/T_B$, and when the output load Po is high, the switching frequency does not fall below the minimum $1/(T_B+T_W)$. Constraining the switching frequency to the above predetermined range reduces the switching loss as well.

Referring to S10, the switching frequency gradually rises when the output load Po is reduced in traditional quasi-resonant converters, thereby generating a much higher switching loss.

As described above, the switching loss can be reduced by restricting the switching frequency within a predetermined range through the blocking period and the sensing period regardless of load.

While this invention has been described in connection with particular embodiments, it is understood that the invention is not limited to the disclosed embodiments, but, on the contrary, is intended to cover various modifications and equivalent arrangements included within the spirit and scope of the appended claims.

What is claimed is:

1. A quasi-resonant converter comprising:
   a primary coil of a transformer having a first end electrically coupled to a rectified DC voltage signal;
   a switch electrically coupled to a second end of the primary coil of the transformer;
   a switching voltage detector for sensing a first signal corresponding to a voltage between ends of the switch; and
   a switching controller for setting a predetermined first period and a second period following the first period, turning on the switch at a first time when the first signal falls to a minimum voltage if the second period includes the first time, and turning on the switch at a second time at an end of the second period if the second period does not include the first time.

2. The quasi-resonant converter of claim 1, wherein the minimum voltage is a voltage at a time when the first signal falls to a minimum after turning off the switch.

3. The quasi-resonant converter of claim 1, wherein the first period starts at a time when the switch is turned on.

4. The quasi-resonant converter of claim 1, wherein the switching controller determines a time of turning off the switch by comparing a signal corresponding to a current flowing through the switch and a signal corresponding to an output voltage of the quasi-resonant converter.

5. The quasi-resonant converter of claim 1, wherein the switching voltage sensor includes a delay circuit, configured to delay a voltage induced at a second coil of the transformer, wherein the delay circuit outputs a second signal corresponding to the first signal.

6. The quasi-resonant converter of claim 5, wherein the delay circuit comprises:

a first resistor and a second resistor electrically coupled in series between the secondary coil and a ground; and
a capacitor electrically coupled between a contact node of the first resistor and the second resistor and the ground.

7. The quasi-resonant converter of claim 6, wherein the switching voltage detector further comprises a diode having a cathode electrically coupled to the contact node of the first resistor and the second resistor, and an anode electrically coupled to the ground.

8. The quasi-resonant converter of claim 5, wherein the switching controller comprises:
   a first vibrator for receiving a control signal controlling a switching operation of the switch, and for generating a third signal to set the first period; and
   a second vibrator for receiving the third signal and for generating a fourth signal to set the second period.

9. The quasi-resonant converter of claim 8, wherein the switching controller further comprises a comparator:
   for generating a fifth signal having a first state and a second state by comparing the second signal with a first reference signal and a second reference signal;
   for setting the fifth signal to the first state if the second signal is higher than the first reference signal;
   for setting the fifth signal to the second state if the second signal is lower than the second reference signal; and
   for setting the fifth signal to sustain a previous state if the second signal is between the first reference signal and the second reference signal.

10. The quasi-resonant converter of claim 9, wherein the switching controller further comprises:
    a signal generator for receiving the third to the fifth signals, and for generating a sixth signal for turning on the switch when the fifth signal change from the first state to the second state in the second period, and for turning on the switch when the fifth signal does not change from the first state to the second state in the second period; and
    a PWM signal generator for controlling the switch by receiving the sixth signal.

11. The quasi-resonant converter of claim 9, wherein a voltage of the first reference signal is higher than a voltage of the second reference signal, and the voltage of the first reference signal is lower than a maximum voltage of the second signal.

12. A method of controlling a quasi-resonant converter including a primary coil of a transformer having a first end electrically coupled to a rectified DC voltage signal and a switch electrically coupled to a second end of the primary coil of the transformer, the method comprising:
    sensing a first signal corresponding to a voltage between ends of the switch;
    setting a predetermined first period and a second period following the first period; and
    turning on the switch at a first time when the first signal falls to a minimum voltage if the second period includes the first time, and turning on the switch at a second time at the end of the second period if the second period does not include the first time.

13. The method of claim 12, further comprising:
    determining a time of turning off the switch by comparing a signal corresponding to a current flowing through the switch and a signal corresponding to an output voltage of the quasi-resonant converter.

14. The method of claim 12, wherein the minimum voltage is a voltage at a time when the first signal falls to a minimum after the switch is turned off.

15. The method of claim 12, wherein the first period is a period starting at a time of turning on the switch.

* * * * *